US011853441B2

(12) United States Patent
Legler

(10) Patent No.: US 11,853,441 B2
(45) Date of Patent: *Dec. 26, 2023

(54) UNTETHERED RESOURCE DISTRIBUTION AND MANAGEMENT

(71) Applicant: Visa International Service Association, San Francisco, CA (US)

(72) Inventor: Matthew Aaron Legler, Round Rock, TX (US)

(73) Assignee: Visa International Service Association, San Francisco, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/004,426

(22) Filed: Aug. 27, 2020

(65) Prior Publication Data

US 2020/0394323 A1 Dec. 17, 2020

Related U.S. Application Data

(63) Continuation of application No. 15/938,540, filed on Mar. 28, 2018, now Pat. No. 10,796,016.

(51) Int. Cl.
*H04L 9/40* (2022.01)
*G06F 21/62* (2013.01)
(Continued)

(52) U.S. Cl.
CPC ....... *G06F 21/6218* (2013.01); *G06Q 20/326* (2020.05); *G06Q 20/381* (2013.01);
(Continued)

(58) Field of Classification Search
None
See application file for complete search history.

(56) References Cited

U.S. PATENT DOCUMENTS 4,837,422 A * 6/1989 Dethloff ............... G06Q 20/381
235/375
5,101,200 A * 3/1992 Swett ................... G07B 15/063
340/928

(Continued)

FOREIGN PATENT DOCUMENTS

EP       2105848 A1 * 9/2009  ............. G06F 16/93
JP    2005250665 A  * 9/2005  ............. G06Q 10/00

OTHER PUBLICATIONS

JP2005250665, Machine Translation (Year: 2005).*

(Continued)

*Primary Examiner* — James R Turchen
*Assistant Examiner* — James J Wilcox
(74) *Attorney, Agent, or Firm* — Kilpatrick Townsend & Stockton LLP

(57) ABSTRACT

A method is disclosed. The method includes receiving, at a computing system, from a user, a request for an access code and one or more constraints on a use of the access code, and identifying a portable device to be associated with the access code. The method also includes obtaining, using the portable device, authorization for one or more potential interactions using the access code. Upon obtaining authorization for the one or more interactions, the method includes generating the access code, which includes an identifier that causes an access request that includes the access code be routed to the computing system. The method also includes receiving, from an access device, an access request comprising the access code in an interaction. Upon determining that the interaction complies with the one or more transaction constraints, the computing system provides an indication to the access device that the interaction is authorized.

20 Claims, 7 Drawing Sheets

(51) Int. Cl.
*G06Q 20/32* (2012.01)
*G06Q 20/38* (2012.01)
*G06Q 20/40* (2012.01)
*H04W 12/08* (2021.01)

(52) U.S. Cl.
CPC ......... *G06Q 20/385* (2013.01); *G06Q 20/405* (2013.01); *H04L 63/0853* (2013.01); *H04L 63/0876* (2013.01); *H04L 63/10* (2013.01); *G06F 2221/2141* (2013.01); *H04W 12/08* (2013.01)

(56) References Cited

U.S. PATENT DOCUMENTS

| | | | | |
|---|---|---|---|---|
| 5,748,783 | A * | 5/1998 | Rhoads | G06F 16/955 707/E17.112 |
| 6,052,675 | A * | 4/2000 | Checchio | G06Q 20/102 705/40 |
| 6,064,666 | A * | 5/2000 | Willner | H04L 51/10 370/352 |
| 6,282,522 | B1 * | 8/2001 | Davis | G06Q 20/40 705/41 |
| 6,328,341 | B2 | 12/2001 | Klure | |
| 6,554,185 | B1 | 4/2003 | Montross et al. | |
| 6,580,683 | B1 * | 6/2003 | Braitberg | G11B 27/105 |
| 6,631,359 | B1 * | 10/2003 | Braitberg | G11B 20/00195 705/50 |
| 6,892,388 | B1 * | 5/2005 | Catanoso | G11B 27/031 348/E7.086 |
| 7,020,774 | B1 * | 3/2006 | Cornuejols | G06Q 20/3674 713/168 |
| 7,028,188 | B1 * | 4/2006 | Moore | G07D 7/004 713/176 |
| 7,107,322 | B1 * | 9/2006 | Freeny, Jr. | G06Q 30/06 709/204 |
| 7,116,840 | B2 * | 10/2006 | Wang | G06F 3/03545 345/156 |
| 7,167,562 | B2 * | 1/2007 | Milgram | G06F 21/80 382/116 |
| 7,191,153 | B1 * | 3/2007 | Braitberg | G06Q 20/24 705/52 |
| 7,251,047 | B2 * | 7/2007 | Meade, II | G06Q 10/10 358/1.18 |
| 7,431,207 | B1 * | 10/2008 | Neemann | G06Q 20/10 235/382 |
| 7,567,364 | B2 * | 7/2009 | Martin | H04N 1/44 358/402 |
| 7,600,676 | B1 * | 10/2009 | Rados | G06Q 20/401 235/382 |
| 7,610,261 | B2 * | 10/2009 | Maloche | G06F 16/958 707/999.102 |
| 7,730,016 | B2 * | 6/2010 | Lee | G06F 12/0253 711/E12.012 |
| 7,908,216 | B1 * | 3/2011 | Davis | G06Q 30/0225 705/41 |
| 7,925,568 | B2 * | 4/2011 | Cullen, III | G06Q 30/08 705/37 |
| 8,190,198 | B1 * | 5/2012 | Venkataramu | H04W 12/06 370/320 |
| 8,213,853 | B2 * | 7/2012 | Levin | B41J 11/006 271/3.09 |
| 8,296,228 | B1 * | 10/2012 | Kloor | G06Q 20/04 705/26.1 |
| 8,319,603 | B1 * | 11/2012 | Bourke | G06F 21/6218 340/517 |
| 8,330,988 | B1 * | 12/2012 | Buzdar | G06Q 10/109 358/1.9 |
| 8,423,457 | B1 * | 4/2013 | Schattauer | G06Q 20/387 705/16 |
| 8,495,648 | B1 * | 7/2013 | Brandwine | H04L 43/04 718/104 |
| 8,527,416 | B2 * | 9/2013 | Flitcroft | G06Q 20/04 705/44 |
| 8,533,860 | B1 * | 9/2013 | Grecia | G06F 21/10 713/185 |
| 8,650,126 | B2 * | 2/2014 | Kwan | G06Q 20/385 705/14.1 |
| 8,700,530 | B2 * | 4/2014 | Smith | G06Q 20/12 705/41 |
| 8,768,838 | B1 * | 7/2014 | Hoffman | G06Q 40/00 705/72 |
| 8,825,517 | B2 * | 9/2014 | Hammad | G06Q 40/12 235/382 |
| 8,892,453 | B2 * | 11/2014 | Nakamura | G06Q 10/02 705/26.1 |
| 9,172,679 | B1 * | 10/2015 | Geddes | H04L 63/0884 |
| 9,424,574 | B2 * | 8/2016 | Bondesen | G06Q 20/3821 |
| 9,460,427 | B2 * | 10/2016 | Fassiotto | G06Q 20/0425 |
| 9,466,060 | B1 * | 10/2016 | Daniel | G06Q 20/40145 |
| 9,565,175 | B1 * | 2/2017 | Saylor | H04W 4/12 |
| 9,679,152 | B1 * | 6/2017 | Young | H04W 12/08 |
| 9,715,689 | B1 * | 7/2017 | Ellis | G06Q 20/20 |
| 9,745,130 | B1 * | 8/2017 | Rawal | G06Q 10/0875 |
| 9,769,162 | B2 * | 9/2017 | De Jong | H04L 63/0853 |
| 9,805,400 | B2 * | 10/2017 | Duggan | G06Q 30/06 |
| 9,986,948 | B2 * | 6/2018 | Sudo | G06F 21/62 |
| 10,121,127 | B1 * | 11/2018 | Isaacson | G06Q 30/0601 |
| 10,200,868 | B1 * | 2/2019 | Young | G06F 21/31 |
| 10,218,695 | B1 * | 2/2019 | Jain | H04L 63/102 |
| 10,380,583 | B1 * | 8/2019 | Ellis | G06Q 20/382 |
| 10,430,599 | B1 * | 10/2019 | Whitmer | G06F 16/152 |
| 10,574,693 | B2 * | 2/2020 | Versteeg | H04L 63/06 |
| 10,592,901 | B2 * | 3/2020 | Flitcroft | G06Q 40/00 |
| 11,599,879 | B2 * | 3/2023 | Ortiz | G06Q 30/0226 |
| 2001/0032154 | A1 * | 10/2001 | Schummer | G06Q 30/06 705/30 |
| 2001/0034702 | A1 * | 10/2001 | Mockett | G06Q 20/023 705/26.1 |
| 2001/0036366 | A1 * | 11/2001 | Cook | H04N 1/00137 396/429 |
| 2002/0016749 | A1 * | 2/2002 | Borecki | G06Q 20/04 705/26.81 |
| 2002/0023023 | A1 * | 2/2002 | Borecki | G06Q 30/0641 705/26.62 |
| 2002/0029350 | A1 * | 3/2002 | Cooper | H04L 63/0823 705/1.1 |
| 2003/0016799 | A1 * | 1/2003 | Stern | H04M 15/06 379/120 |
| 2003/0018575 | A1 * | 1/2003 | Beggins | G06Q 40/04 705/38 |
| 2003/0028481 | A1 * | 2/2003 | Flitcroft | G07F 7/122 705/39 |
| 2003/0033211 | A1 * | 2/2003 | Haines | B01J 23/6562 705/14.1 |
| 2003/0046556 | A1 * | 3/2003 | Attwater | G06Q 20/40145 705/64 |
| 2003/0097344 | A1 * | 5/2003 | Chaum | G07F 7/1008 705/75 |
| 2003/0145205 | A1 * | 7/2003 | Sarcanin | G06Q 20/3821 713/172 |
| 2003/0200168 | A1 * | 10/2003 | Cullen, III | G06Q 30/04 705/37 |
| 2003/0200179 | A1 * | 10/2003 | Kwan | G06Q 20/385 705/65 |
| 2003/0208371 | A1 * | 11/2003 | McGrath | G06Q 10/107 705/64 |
| 2004/0044739 | A1 | 3/2004 | Ziegler | |
| 2004/0064375 | A1 * | 4/2004 | Randell | G06Q 40/02 705/30 |
| 2004/0117813 | A1 * | 6/2004 | Karaoguz | H04N 21/2743 725/86 |
| 2004/0148254 | A1 * | 7/2004 | Hauser | G06Q 20/04 705/39 |
| 2004/0230527 | A1 * | 11/2004 | Hansen | G06Q 20/02 705/40 |
| 2004/0254848 | A1 * | 12/2004 | Golan | G06Q 20/12 705/26.1 |

(56) References Cited

U.S. PATENT DOCUMENTS

| | | | | |
|---|---|---|---|---|
| 2005/0005298 A1* | 1/2005 | Tranchina | H04N 21/4113 | 348/E7.086 |
| 2005/0125340 A1* | 6/2005 | Lin | G06Q 20/40 | 705/39 |
| 2005/0199708 A1* | 9/2005 | Friedman | G07F 7/0813 | 235/380 |
| 2005/0203835 A1* | 9/2005 | Nhaissi | G06Q 20/10 | 705/40 |
| 2005/0209964 A1* | 9/2005 | Allen | G06Q 20/102 | 705/40 |
| 2005/0240432 A1* | 10/2005 | Jensen | G06Q 30/06 | 705/26.1 |
| 2005/0246765 A1* | 11/2005 | Utsumi | G11B 20/00702 | 726/5 |
| 2005/0252961 A1* | 11/2005 | Rasti | G06Q 20/385 | 235/380 |
| 2007/0125620 A1* | 6/2007 | Sorenson | H04M 17/00 | 194/217 |
| 2007/0187491 A1* | 8/2007 | Godwin | G06Q 20/40 | 235/380 |
| 2007/0194107 A1* | 8/2007 | Aigbogun | G06Q 20/28 | 235/380 |
| 2007/0250573 A1* | 10/2007 | Rothschild | G06F 16/9535 | 709/205 |
| 2007/0253553 A1* | 11/2007 | Abdul Rahman | G07F 7/1008 | 380/259 |
| 2007/0295194 A1* | 12/2007 | Reverdin | G09B 15/02 | 84/470 R |
| 2008/0018089 A1* | 1/2008 | Hoarau | B42F 9/008 | 281/15.1 |
| 2008/0074707 A1* | 3/2008 | Cranitch | H04N 1/00209 | 358/403 |
| 2008/0076402 A1* | 3/2008 | Jeong | H04N 21/4722 | 348/E7.071 |
| 2008/0120698 A1* | 5/2008 | Ramia | H04L 63/08 | 726/4 |
| 2008/0120707 A1* | 5/2008 | Ramia | H04L 9/3231 | 726/5 |
| 2008/0217399 A1* | 9/2008 | Leblanc | G06Q 20/04 | 235/380 |
| 2008/0261635 A1* | 10/2008 | Samiri | G06Q 30/02 | 455/466 |
| 2008/0270245 A1* | 10/2008 | Boukadoum | G06Q 40/00 | 705/17 |
| 2008/0274808 A1* | 11/2008 | Walker | G07F 17/3237 | 463/31 |
| 2008/0288395 A1* | 11/2008 | Srinivasan | G06Q 30/06 | 705/1.1 |
| 2008/0288405 A1* | 11/2008 | John | G06Q 20/384 | 705/44 |
| 2009/0113530 A1 | 4/2009 | Brainard et al. | | |
| 2009/0144328 A1* | 6/2009 | Martinez | G06Q 30/0603 | 715/764 |
| 2009/0154832 A1* | 6/2009 | Pham | G06T 7/30 | 382/280 |
| 2009/0164330 A1* | 6/2009 | Bishop | G06Q 20/02 | 705/19 |
| 2009/0199131 A1* | 8/2009 | Kagan | G06F 40/174 | 715/810 |
| 2009/0216651 A1* | 8/2009 | Ghafoor | G07F 19/20 | 705/17 |
| 2009/0244642 A1* | 10/2009 | Dalrymple | H04N 1/6033 | 358/518 |
| 2009/0259547 A1* | 10/2009 | Clopp | G06Q 30/02 | 705/14.16 |
| 2009/0276305 A1* | 11/2009 | Clopp | G06Q 30/0214 | 705/14.16 |
| 2009/0292619 A1* | 11/2009 | Kagan | G06Q 20/102 | 705/40 |
| 2009/0328081 A1* | 12/2009 | Bille | H04L 63/10 | 709/219 |
| 2010/0036827 A1* | 2/2010 | Jain | G06F 16/332 | 707/E17.108 |
| 2010/0114733 A1* | 5/2010 | Collas | G06Q 30/0613 | 705/26.1 |
| 2010/0138324 A1* | 6/2010 | Allen | G06Q 20/02 | 705/30 |
| 2010/0169223 A1* | 7/2010 | Yuan | G06Q 20/3674 | 709/201 |
| 2010/0190471 A1* | 7/2010 | Smith | G06Q 20/204 | 455/408 |
| 2010/0191646 A1* | 7/2010 | Smith | G06Q 20/42 | 705/40 |
| 2010/0194761 A1* | 8/2010 | Rhee | G06T 13/80 | 345/473 |
| 2010/0216425 A1* | 8/2010 | Smith | G06Q 20/322 | 455/406 |
| 2010/0223183 A1* | 9/2010 | Smith | H04M 15/80 | 455/411 |
| 2010/0241572 A1* | 9/2010 | Yuan | G06Q 20/02 | 707/769 |
| 2010/0245375 A1* | 9/2010 | Rhodes | G09G 3/344 | 345/589 |
| 2010/0293041 A1* | 11/2010 | Teasdale | G06Q 50/20 | 705/14.1 |
| 2010/0306099 A1* | 12/2010 | Hirson | H04L 67/535 | 455/414.1 |
| 2010/0312704 A1 | 12/2010 | Rohatgi | | |
| 2010/0318415 A1 | 12/2010 | Gottlieb | | |
| 2010/0332391 A1* | 12/2010 | Khan | G06Q 20/40 | 713/186 |
| 2011/0035302 A1* | 2/2011 | Martell | G06Q 40/03 | 705/40 |
| 2011/0080418 A1* | 4/2011 | Rhodes | G09G 5/393 | 345/545 |
| 2011/0106698 A1* | 5/2011 | Isaacson | G06Q 30/02 | 705/41 |
| 2011/0131128 A1* | 6/2011 | Vaananen | G06Q 20/327 | 705/37 |
| 2011/0140857 A1* | 6/2011 | Hull | G06K 7/10356 | 340/10.1 |
| 2011/0143710 A1* | 6/2011 | Hirson | H04M 15/00 | 455/414.1 |
| 2011/0143711 A1* | 6/2011 | Hirson | H04L 63/18 | 455/410 |
| 2011/0213671 A1* | 9/2011 | Hirson | G06Q 20/3255 | 705/16 |
| 2011/0217994 A1* | 9/2011 | Hirson | H04M 15/00 | 455/466 |
| 2011/0237222 A1* | 9/2011 | Niejadlik | H04L 63/10 | 455/411 |
| 2011/0237232 A1* | 9/2011 | Hirson | H04W 4/24 | 455/414.3 |
| 2011/0238483 A1* | 9/2011 | Yoo | G06Q 30/02 | 705/14.38 |
| 2011/0243326 A1* | 10/2011 | Young | H04N 1/442 | 380/246 |
| 2011/0258062 A1* | 10/2011 | Hirson | G06Q 30/0601 | 705/26.1 |
| 2011/0276478 A1* | 11/2011 | Hirson | G06Q 20/16 | 705/40 |
| 2011/0296456 A1* | 12/2011 | Pandala | H04N 21/8133 | 715/762 |
| 2011/0320291 A1* | 12/2011 | Coon | G06Q 20/425 | 705/16 |
| 2012/0011059 A1* | 1/2012 | Hirson | G06Q 20/10 | 455/414.1 |
| 2012/0016731 A1* | 1/2012 | Smith | G06Q 20/20 | 705/17 |
| 2012/0041870 A1* | 2/2012 | Baskerville | G06Q 20/10 | 705/39 |
| 2012/0047070 A1* | 2/2012 | Pharris | G06Q 20/326 | 705/42 |
| 2012/0066120 A1* | 3/2012 | Ringewald | G06Q 20/3223 | 705/40 |
| 2012/0101875 A1* | 4/2012 | Nicolaidis | G06Q 30/0207 | 705/14.1 |

(56) References Cited

U.S. PATENT DOCUMENTS

| | | | |
|---|---|---|---|
| 2012/0123832 A1* | 5/2012 | Nicolaidis | G06Q 30/0208 705/14.11 |
| 2012/0123833 A1* | 5/2012 | Nicolaidis | G06Q 30/0208 705/14.11 |
| 2012/0123834 A1* | 5/2012 | Nicolaidis | G06Q 20/342 705/14.11 |
| 2012/0123922 A1* | 5/2012 | Nicolaidis | G06Q 30/02 705/35 |
| 2012/0123923 A1* | 5/2012 | Nicolaidis | G06Q 30/0283 705/35 |
| 2012/0143753 A1* | 6/2012 | Gonzalez | G06Q 20/12 705/41 |
| 2012/0150600 A1* | 6/2012 | Isaacson | G06Q 20/384 705/14.23 |
| 2012/0150643 A1* | 6/2012 | Wolfe | G06Q 20/34 705/41 |
| 2012/0150729 A1* | 6/2012 | Isaacson | G06Q 20/342 705/39 |
| 2012/0150730 A1* | 6/2012 | Isaacson | G06Q 20/10 705/39 |
| 2012/0150731 A1* | 6/2012 | Isaacson | G06Q 30/06 705/39 |
| 2012/0150732 A1* | 6/2012 | Isaacson | G06Q 20/384 705/39 |
| 2012/0150743 A1* | 6/2012 | Isaacson | G06Q 30/06 705/41 |
| 2012/0157042 A1* | 6/2012 | McCanna | H04M 15/83 455/407 |
| 2012/0157062 A1* | 6/2012 | Kim | H04M 15/41 705/26.1 |
| 2012/0171990 A1* | 7/2012 | Williams | H04W 4/24 455/406 |
| 2012/0173322 A1* | 7/2012 | Ringewald | G06Q 20/123 705/14.16 |
| 2012/0173348 A1* | 7/2012 | Yoo | G07F 9/001 705/16 |
| 2012/0190386 A1* | 7/2012 | Anderson | G01S 19/14 455/456.3 |
| 2012/0221437 A1* | 8/2012 | Yoo | G06Q 20/209 705/26.41 |
| 2012/0226490 A1* | 9/2012 | Mashiah | G06F 3/0237 704/8 |
| 2012/0226545 A1* | 9/2012 | Gebb | G06Q 20/387 705/14.27 |
| 2012/0226604 A1* | 9/2012 | Isaacson | G06Q 30/0215 705/39 |
| 2012/0229517 A1* | 9/2012 | Plummer | G06K 15/1835 345/660 |
| 2012/0234911 A1 | 9/2012 | Yankovich et al. | |
| 2012/0245987 A1* | 9/2012 | Isaacson | G06Q 30/06 705/14.23 |
| 2012/0246071 A1 | 9/2012 | Jain et al. | |
| 2012/0276868 A1* | 11/2012 | Martell | H04L 12/1453 455/406 |
| 2012/0282893 A1* | 11/2012 | Kim | G06Q 20/385 455/406 |
| 2012/0295580 A1* | 11/2012 | Corner | G06Q 20/385 455/410 |
| 2012/0303430 A1* | 11/2012 | Tiku | G06Q 20/384 705/14.27 |
| 2013/0159085 A1* | 6/2013 | Mankoff | G06Q 30/0226 705/14.27 |
| 2013/0166445 A1* | 6/2013 | Isaacson | G06Q 30/0224 705/41 |
| 2013/0174272 A1* | 7/2013 | Chevalier | H04L 63/0428 726/28 |
| 2013/0191287 A1* | 7/2013 | Gainer, III | G07F 19/205 705/44 |
| 2013/0191897 A1* | 7/2013 | Lindteigen | G06F 21/44 726/6 |
| 2013/0200999 A1* | 8/2013 | Spodak | G16H 10/65 340/5.65 |
| 2013/0218763 A1* | 8/2013 | Wilkes | G06Q 20/10 705/40 |
| 2013/0220157 A1* | 8/2013 | Heng | B41F 33/0081 101/481 |
| 2013/0276036 A1* | 10/2013 | Tranchina | H04N 21/41422 725/75 |
| 2013/0291122 A1* | 10/2013 | Vyas | G06F 21/6218 726/28 |
| 2013/0304527 A1* | 11/2013 | Santos, III | G06Q 30/0239 705/14.66 |
| 2013/0304576 A1* | 11/2013 | Berland | G06Q 30/0236 705/14.53 |
| 2013/0311279 A1 | 11/2013 | Bui | |
| 2013/0339117 A1 | 12/2013 | Chapman et al. | |
| 2014/0012739 A1* | 1/2014 | Wall | G06Q 20/383 705/39 |
| 2014/0040139 A1 | 2/2014 | Brudnicki et al. | |
| 2014/0058815 A1* | 2/2014 | Hiremath | G06Q 20/384 705/14.17 |
| 2014/0100929 A1* | 4/2014 | Burgess | G06Q 30/02 705/14.17 |
| 2014/0108263 A1* | 4/2014 | Ortiz | G06Q 20/36 705/44 |
| 2014/0108785 A1* | 4/2014 | Lindteigen | H04L 9/14 713/156 |
| 2014/0111314 A1* | 4/2014 | Rietzler | G06Q 50/28 340/10.51 |
| 2014/0156104 A1* | 6/2014 | Healey | G07C 5/008 701/1 |
| 2014/0162598 A1* | 6/2014 | Villa-Real | G07F 7/0886 455/411 |
| 2014/0194187 A1 | 7/2014 | Lewis | |
| 2014/0201084 A1* | 7/2014 | Dagenais | G06Q 20/382 705/64 |
| 2014/0236824 A1* | 8/2014 | Amaya Calvo | G06Q 20/322 705/44 |
| 2014/0237567 A1* | 8/2014 | Furlong | H04L 63/083 726/6 |
| 2014/0250002 A1* | 9/2014 | Isaacson | G06Q 30/0226 705/39 |
| 2014/0250006 A1* | 9/2014 | Makhotin | G06Q 20/326 705/41 |
| 2014/0263627 A1* | 9/2014 | Wyatt | G06Q 20/24 235/380 |
| 2014/0310172 A1* | 10/2014 | Grossman | G06Q 20/10 705/44 |
| 2014/0359554 A1* | 12/2014 | Ritter | G06Q 10/103 717/101 |
| 2014/0379361 A1* | 12/2014 | Mahadkar | G06Q 40/08 705/2 |
| 2015/0004935 A1* | 1/2015 | Fu | H04W 12/06 455/411 |
| 2015/0019666 A1* | 1/2015 | Ruff | H04L 1/1621 709/206 |
| 2015/0154600 A1* | 6/2015 | Diehl | G06Q 20/4016 705/39 |
| 2015/0206251 A1* | 7/2015 | Yofe | G06Q 40/12 705/30 |
| 2015/0227882 A1* | 8/2015 | Bhatt | G06Q 10/083 705/330 |
| 2015/0310417 A1* | 10/2015 | Syed | G06Q 20/322 705/39 |
| 2015/0310477 A1* | 10/2015 | Mankoff | G06Q 30/0226 705/14.27 |
| 2015/0326576 A1* | 11/2015 | Eckerdt | G06F 21/33 713/175 |
| 2015/0348001 A1* | 12/2015 | Van Os | G06Q 20/227 705/44 |
| 2015/0365512 A1* | 12/2015 | MacKenzie | H04W 12/0431 455/420 |
| 2016/0012465 A1* | 1/2016 | Sharp | G06Q 20/321 705/14.17 |
| 2016/0019517 A1* | 1/2016 | Kirsh | G06Q 20/047 705/24 |
| 2016/0019536 A1* | 1/2016 | Ortiz | G06Q 20/36 705/67 |

(56) References Cited

U.S. PATENT DOCUMENTS

| | | | | |
|---|---|---|---|---|
| 2016/0043867 | A1* | 2/2016 | Bonsignore | H04L 63/0442 713/168 |
| 2016/0055698 | A1* | 2/2016 | Gudmundsson | H04L 63/108 340/5.52 |
| 2016/0071102 | A1* | 3/2016 | Alvarez | G06Q 20/401 705/16 |
| 2016/0086445 | A1 | 3/2016 | Tsutsui | |
| 2016/0247053 | A1* | 8/2016 | Ward | G06K 15/1809 |
| 2016/0248773 | A1 | 8/2016 | Bildoy | |
| 2016/0283699 | A1* | 9/2016 | Levin | G06F 21/73 |
| 2016/0300214 | A1* | 10/2016 | Chaffin | G06Q 20/22 |
| 2016/0307247 | A1* | 10/2016 | Sells | G06Q 30/0611 |
| 2016/0316346 | A1* | 10/2016 | Himmelstein | H04W 4/02 |
| 2016/0323289 | A1* | 11/2016 | Tsutsumi | H04L 63/108 |
| 2016/0379181 | A1* | 12/2016 | Nordlof | G06Q 20/4016 705/79 |
| 2017/0039568 | A1* | 2/2017 | Tunnell | G06F 21/33 |
| 2017/0068960 | A1* | 3/2017 | Kwak | G06Q 20/405 |
| 2017/0091769 | A1 | 3/2017 | Wong Hak Keung et al. | |
| 2017/0093860 | A1* | 3/2017 | Hafernik | H04W 4/023 |
| 2017/0109746 | A1* | 4/2017 | Mohandas | G06Q 20/102 |
| 2017/0131954 | A1* | 5/2017 | Lagares-Greenblatt | G06F 3/1262 |
| 2017/0164062 | A1* | 6/2017 | Abramov | H04N 21/2665 |
| 2017/0169422 | A1 | 6/2017 | Ye et al. | |
| 2017/0180388 | A1* | 6/2017 | Belz | H04L 63/0853 |
| 2017/0206346 | A1* | 7/2017 | Eleish | G06F 3/0482 |
| 2017/0206721 | A1* | 7/2017 | Koo | G07C 9/00182 |
| 2017/0221141 | A1* | 8/2017 | Hatchett | G06Q 50/16 |
| 2017/0243181 | A1* | 8/2017 | Tyma | G06Q 20/108 |
| 2017/0256000 | A1* | 9/2017 | Isaacson | G06Q 50/01 |
| 2017/0316250 | A1* | 11/2017 | Roh | G06F 3/0412 |
| 2017/0323354 | A1* | 11/2017 | Martell | H04M 15/866 |
| 2017/0329475 | A1* | 11/2017 | Park | G06F 3/0486 |
| 2017/0330144 | A1* | 11/2017 | Wakim | H04W 4/023 |
| 2017/0337604 | A1* | 11/2017 | Fung | G06Q 30/0609 |
| 2017/0352011 | A1* | 12/2017 | Sells | G06Q 10/20 |
| 2017/0359683 | A1* | 12/2017 | Obradovich | H04L 67/30 |
| 2018/0018729 | A1* | 1/2018 | Grimes | G06Q 30/0255 |
| 2018/0047020 | A1* | 2/2018 | Vasta | G06Q 20/3276 |
| 2018/0053157 | A1* | 2/2018 | Roffey | G06K 19/06206 |
| 2018/0068284 | A1* | 3/2018 | Wudaru | G06Q 20/12 |
| 2018/0068294 | A1* | 3/2018 | Melgar | G06Q 20/10 |
| 2018/0082283 | A1* | 3/2018 | Sharma | G06Q 20/42 |
| 2018/0108014 | A1* | 4/2018 | Williams | G06Q 20/3829 |
| 2018/0114201 | A1* | 4/2018 | Kadharmestan | G06Q 20/10 |
| 2018/0115894 | A1* | 4/2018 | Maresh | H04L 63/10 |
| 2018/0130064 | A1* | 5/2018 | Bos | G06Q 20/42 |
| 2018/0160305 | A1* | 6/2018 | Hughes | H04L 9/321 |
| 2018/0167394 | A1* | 6/2018 | High | H04L 63/123 |
| 2018/0174237 | A1* | 6/2018 | Hosny | G06Q 40/04 |
| 2018/0191728 | A1* | 7/2018 | Kim | H04L 63/126 |
| 2018/0197264 | A1* | 7/2018 | Geist | G06Q 50/30 |
| 2018/0211724 | A1* | 7/2018 | Wang | G16H 40/20 |
| 2018/0232720 | A1* | 8/2018 | Robeen | G06Q 20/351 |
| 2018/0240086 | A1* | 8/2018 | Sobotka | H04L 9/0819 |
| 2018/0268383 | A1* | 9/2018 | Kim | G06Q 20/321 |
| 2018/0309744 | A1* | 10/2018 | Chou | G06F 21/42 |
| 2018/0315040 | A1* | 11/2018 | Isaacson | G06Q 20/351 |
| 2018/0315051 | A1* | 11/2018 | Hurley | G06Q 20/3255 |
| 2019/0019171 | A1* | 1/2019 | Silvestre | G06Q 20/385 |
| 2019/0080321 | A1* | 3/2019 | Mundis | G06Q 20/3674 |
| 2019/0141136 | A1* | 5/2019 | Karnik | H04W 88/04 |
| 2019/0146969 | A1* | 5/2019 | Kumar | G06F 16/00 434/362 |
| 2019/0188900 | A1* | 6/2019 | Troy | G06F 30/15 |
| 2019/0213235 | A1* | 7/2019 | Baltieri | G06F 17/18 |
| 2019/0311339 | A1* | 10/2019 | Nguyen | G06Q 20/322 |
| 2020/0074446 | A1* | 3/2020 | Isaacson | G06Q 20/342 |
| 2020/0380501 | A1* | 12/2020 | Ramanathan | G06Q 20/322 |
| 2020/0387887 | A1* | 12/2020 | Rathod | G06Q 20/3224 |
| 2020/0402138 | A1* | 12/2020 | Isaacson | H04W 12/084 |
| 2021/0049560 | A1* | 2/2021 | Kulpati | G06Q 20/02 |
| 2021/0056603 | A1* | 2/2021 | Vidal | A63F 13/87 |
| 2021/0258320 | A1* | 8/2021 | Butler | G06Q 20/342 |
| 2022/0156802 | A1* | 5/2022 | Ross | G06F 16/953 |
| 2022/0198865 | A1* | 6/2022 | Lodha | G16H 50/80 |
| 2022/0292543 | A1* | 9/2022 | Henderson | G06Q 30/0252 |
| 2022/0398556 | A1* | 12/2022 | Grassadonia | G06Q 20/42 |
| 2022/0398619 | A1* | 12/2022 | Cooper | G06Q 30/0215 |

OTHER PUBLICATIONS

Visa "Verified by Visa Acquirer Merchant Implementation Guide," US Region, pp. 1-114, May 2011 (Year: 2011).*

Lutz et al. A Survey of Payment Approaches for Identity Federations in Focus of SAML Technology, IEEE Communications Surveys & Tutorials, vol. 15, Issue: 4, pp. 1979-1999 (Year: 2019).*

Zhu et al. "Trust Your Wallet: a New Online Wallet Architecture for Bitcoin," IEEE, pp. 307-311 (Year: 2017).*

Mirembe et al. "A Model for Electronic Money Transfer for Low Resourced Environments: M-Cash," Third International Conference on Broadband Communications, Information Technology & Biomedical Applications, IEEE Computer Society, pp. 389-393 (Year: 2008).*

Tao et al. "Retailers' Optimal Strategy of Free Gift Card with Expiry Date," IEEE, pp. 1-4 (Year: 2014).*

Chang "A Secure Cloud-based Payment Model for M-Commerce," 2013 42nd International Conference on Parallel Processing, IEEE, pp. 1082-1086 (Year: 2013).*

Wu "A QR Code-Based on-Street Parking Fee Payment Mechanism," 2014 Tenth International Conference on Intelligent Information Hiding and Multimedia Signal Processing, IEEE Computer Society, pp. 106-109 (Year: 2014).*

U.S. Appl. No. 15/938,540, Non-Final Office Action, dated Feb. 12, 2020, 17 pages.

U.S. Appl. No. 15/938,540, Notice of Allowance, dated Jun. 1, 2020, 12 pages.

Application No. PCT/US2019/022591, International Search Report and Written Opinion, dated Jun. 26, 2019, 11 pages.

* cited by examiner

UNTETHERED RESOURCE DISTRIBUTION AND MANAGEMENT

This application is a continuation application of U.S. patent application Ser. No. 15/938,540, filed on Mar. 28, 2018, which is herein incorporated by reference in its entirety.

BACKGROUND

As technology surrounding electronic resource distribution systems has continued to advance, the biggest limitation to the capabilities of such systems has become the limited functionality of legacy resource provider systems (e.g., access devices, transaction processing devices, etc.). Such legacy systems are often not capable of adapting to new functionality as it becomes available to the electronic resource distribution systems.

For example, users often avoid carrying currency, either for security reasons or because the use of currency has become increasingly inconvenient. However, these same users often find themselves in a position in which they would like to provide access to funds or other resources to another user, but only they have access to electronic accounts. Funds or other resources associated with an electronic account may be tethered to a particular user's identity, such that only an authorized user for an account is typically able to access those resources. Hence, even if a first user could provide an account access instrument to a second user, that user would need to be authenticated prior to providing access to resources of the account.

Embodiments of the present invention address these problems and other problems, individually and collectively.

SUMMARY

Embodiments of the disclosure are directed to a system in which a user is able to untether some amount of resources from an account to be associated with a code. The code may be used by any party having possession of that code to complete an interaction such as a transaction using the resources. In some embodiments, the user may request the generation of a code from a computing system operated by a service provider by submitting a selection of an account and a number of constraints to be associated with a potential transaction using that code. The service provider, in some embodiments, may seek authorization for a potential transaction based on the provided constraints from an authorization entity computer operated by an authorization entity associated with the account. Upon receiving authorization for the potential transaction, the service provider may provide the code to the user. The user may use the code or may transfer the code to another party for use. In some embodiments, the code may be presented to a resource provider and may be used to obtain resources from that resource provider in a transaction so long as the transaction complies with the constraints provided in the request.

One embodiment of the invention is directed to a computer-implemented method comprising receiving, at a computing system, from a user, a request for an access code and one or more constraints on a use of the access code; identifying, by the computing system, a portable device to be associated with the access code; obtaining, by the computing system and using the portable device, authorization for one or more potential interactions using the access code; upon obtaining authorization for the one or more interactions, generating, by the computing system, the access code, which includes an identifier that causes an access request that includes the access code be routed to the computing system; receiving, at the computing system, from an access device, an access request comprising the access code in an interaction; and upon determining that the interaction complies with the one or more transaction constraints, providing, by the computing system, an indication to the access device that the interaction is authorized.

Another embodiment of the invention is directed to a computing system comprising: a processor, and a memory including instructions that, when executed with the processor, cause the computing system to receive, from a user, a request for an access code and one or more constraints on a use of the access code; identifying a portable device to be associated with the access code; obtain, using the portable device, authorization for one or more potential interactions using the access code; upon obtaining authorization for the one or more interactions, generating the access code, which includes an identifier that causes an access request that includes the access code be routed to the computing system; receive from an access device, an access request comprising the access code in an interaction; and upon determining that the interaction complies with the one or more transaction constraints, provide an indication to the access device that the interaction is authorized.

Further details regarding embodiments of the invention can be found in the Detailed Description and the Figures.

DETAILED DESCRIPTION

Figure 1:
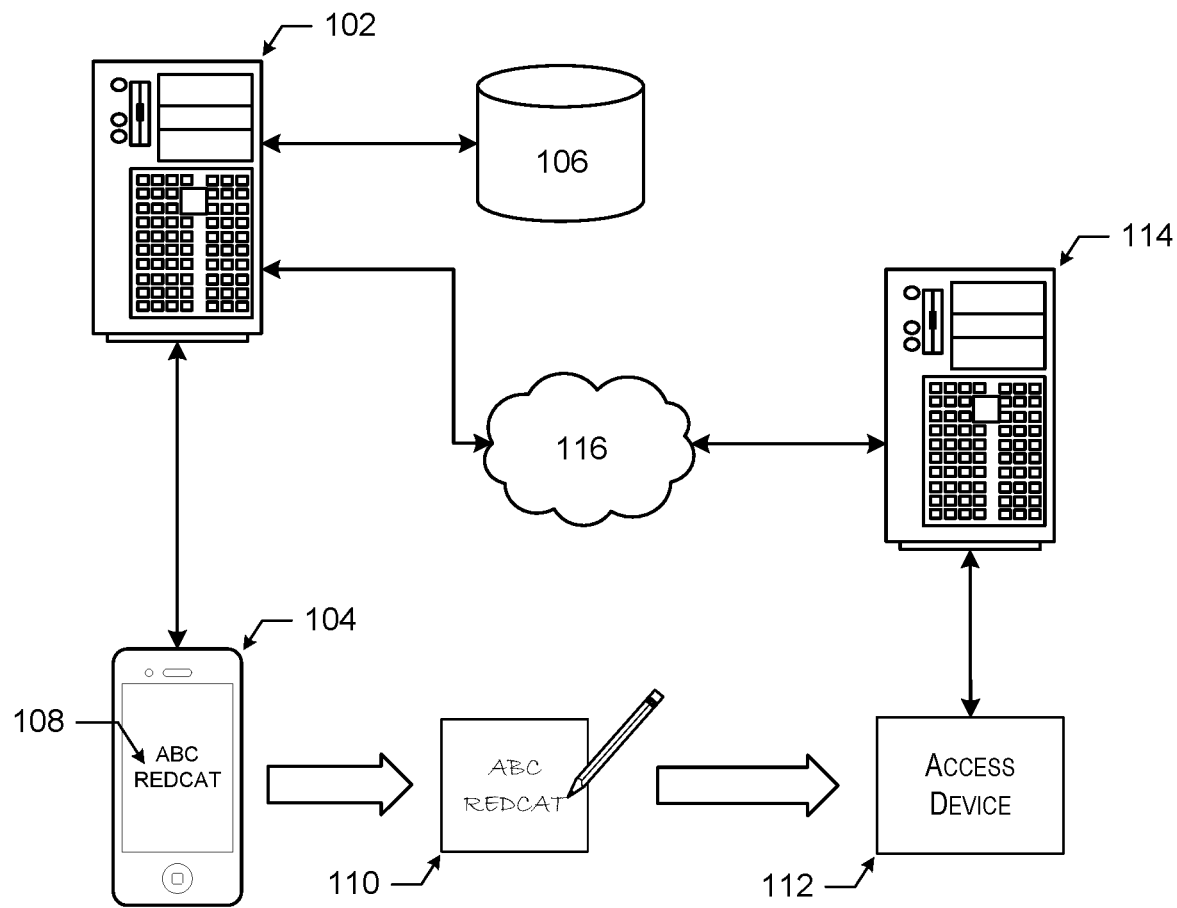
FIG. 1 depicts an illustrative example interaction that may take place in accordance with at least some embodiments.

Prior to discussing specific embodiments of the invention, some terms may be described in detail.

An "access device" may be any suitable device for communicating with a resource provider computer or transaction processing network, and for interacting with a payment device, a user computer apparatus, and/or a client device. An access device may generally be located in any suitable location, such as at the location of a resource provider (e.g., a merchant). An access device may be in any suitable form. Some examples of access devices include point-of-sale (POS) terminals/devices, cellular phones, personal data assistants (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a client device. In some embodiments, where an access device may comprise a POS terminal, any suitable POS terminal may be used and may include a reader, a processor, and a computer-readable medium. A reader may include any suitable contact or contactless mode of operation. For example, readers can include radio frequency (RF) antennas, optical scanners, bar code readers, or magnetic stripe readers to interact with a communication device. In some embodiments, an access device may also be referred to as a terminal device.

"Account data" may refer to any content of an account of a user conducting a transaction. In some embodiments, account data may be payment account data that may be utilized to make a purchase. In other embodiments, account data may be any content associated with a user's non-financial account. For example, account data may include electronic files, photos, videos, and documents stored by the user's account. In some embodiments, account data may be stored by an authorization computer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, resource provider identifier, resource provider location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, resource provider must call the toll-free authorization phone number. The authorization response message may also include an authorization code, which may be a code that a credit card issuing bank returns in response to an authorization request message in an electronic message (either directly or through the transaction processing computer) to the resource provider's access device (e.g. POS equipment) that indicates approval of the transaction. The code may serve as proof of authorization. In some embodiments, a transaction processing network may generate or forward the authorization response message to the resource provider.

A "client device" may be any electronic device capable of establishing a communication session with another electronic device (e.g., an application server) and transmitting/receiving data from that device. A client device may include the ability to download and/or execute mobile applications. Client devices may include mobile communication devices as well as personal computers and thin-client devices.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "portable device" may refer to any suitable device that may be portable. It may be used to conduct a financial transaction, such as to provide payment information to a merchant. A portable device may be in any suitable form. For example, suitable portable devices may be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable devices include cellular phones, personal digital assistants (PDAs), pagers, payment cards, security cards, access cards, smart media, transponders, 2-D barcodes, an electronic or digital wallet, wearable devices such as smart watches, fitness bands, ankle bracelets, rings, earrings, and the like. If the portable device is in the form of a debit, credit, or smartcard, the payment device may also optionally have features such as magnetic stripes. Such devices can operate in either a contact or contactless mode.

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may be a good or service, a physical building, a computer account or file, or a payment account. In some embodiments, a resource may refer to a financial product, such as a loan or line of credit.

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services. A "resource provider computer" may be any computing device operated by a resource provider.

A "computing system" may including any suitable computation device or devices. In some embodiments, a computing system may include a server computer.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client devices.

An "interaction" may be a reciprocal action or influence. An example of an interaction may be a transaction.

A "transaction" may be any suitable exchange between two or more entities. For example, a transaction may include a first electronic device (e.g., a client device) requesting resources from a second electronic device (e.g., a resource provider).

A "transaction processing network" (e.g., VisaNet®) may include data processing subsystems, networks, and operations used to support and deliver authorization services, exception file services, and clearing and settlement services. An exemplary transaction processing network may include VisaNet®. Transaction processing networks such as VisaNet® are able to process credit card transactions, debit card transactions, and other types of commercial transactions. VisaNet® in particular, includes a VIP system (Visa Integrated Payments system) which processes authorization requests and a Base II system which performs clearing and settlement services.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

FIG. 1 depicts an illustrative example interaction that may take place in accordance with at least some embodiments. In FIG. 1, a user may connect to a service provider computer 102 via a client device 104. In some embodiments, the service provider computer 102 may maintain a number of accounts. In some embodiments, the service provider computer 102 may maintain an account associated with the client device 104 and/or its user. The account maintained by the service provider computer 102 may store a number of data related to the user. For example, the service provider computer 102 may store user data, payment device data, user preference data, or any other suitable user data.

The service provider computer 102 may be any computing device capable of performing at last a portion of the functions described herein. The service provider computer 102 may be a remote server computer that is part of a computing system. In some embodiments, the service provider computer 102 may be a mobile application server that provides backend support for a mobile application installed upon the client device 104. In some embodiments, the service provider computer 102 may maintain one or more databases 106 that include account data and/or transaction related mappings to codes.

The client device 104 may comprise any suitable computing device capable of receiving a request from a user and presenting a code in accordance with embodiments of the disclosure. The client device 104 may include at least a processor and a memory. The memory of the client device 104 may include at least computer-executable instructions that cause the processor to perform certain functions in accordance with embodiments of this disclosure. For example, the memory may include a mobile application that causes the client device 104 to initiate a process to generate a code 108. The code 108 may be an access code, which allows a person in possession of the code 108 to obtain access to a resource such as goods, services, data, etc. This may involve transmitting a request for a code to a service provider computer 102.

In some embodiments, upon execution of a mobile application installed upon the client device 104, the client device 104 may establish a communication session with a service provider computer 102 in which at least some processing is performed by the service provider computer 102 on behalf of the mobile application. The service provider computer 102 may, upon receiving a request from the mobile application, associate that request with a code to be used in accordance with constraints specified within the request. In some embodiments, the code may be generated by the service provider computer 102. In some embodiments, the code may be selected from a list of available codes. In some embodiments, the service provider computer 102 may receive the code from the client device 104. The service provider computer 102 may then provide, to the client device 104, the code associated with the request. In some embodiments, the service provider computer 102 may obtain pre-authorization for the transaction prior to providing the code 108 to the client device 104.

In some embodiments, a code 108 may include any suitable string of characters that may be used by the service provider computer 102 to identify a particular transaction. In some embodiments, the code 108 may be a numeric string. In at least some of these embodiments, the code 108 may be a 16-digit numeric string which is formatted similar to a credit card number. In some embodiments, the code 108 may be a word or phrase. The word or phrase may be nonsensical.

In the example interaction of FIG. 1, the code 108 may be provided to another person or a resource provider as a bearer instrument (i.e., it can be used by any person having possession of the code 108) on some medium 110. In some embodiments, the code 108 may be transferred to some other form of media. For example, the code 108 may be written on a piece of paper. The code 108, once generated, may be used to conduct any transaction at any resource provider that has the capability to accept the code, so long as the transaction complies with one or more constraints indicated within the request. The code 108 may also be used by any person, regardless of whether that person is the one for whom the code was generated.

In some embodiments, the code 108 may be formatted such that it can be entered at an access device 112 in order to complete a transaction. In some embodiments, the code 108 may be formatted in a manner similar to that of a credit card number or other primary account number (PAN). In these embodiments, an operator of the access device 112 may enter the code 108 in lieu of a PAN when accepting payment for a transaction. For example, the operator may manually enter the code 108 using a manual credit card number input process. The access device 112, or a transport computer 114 in communication with the access device 112, upon receiving the code 108, may generate an authorization request message in a manner similar to that in which a credit card number has been used. The authorization request message may then be routed to a transaction processing network 116 in a manner similar to that in which a credit card number has been used. The transaction processing network 116 may then determine, based on information included in the code 108, that the authorization request message should be routed to the service provider computer 102 instead of a typical authorization entity computer operated by an authorization entity (e.g., an issuer). Once the service provider computer 102 receives the authorization request message, it may determine whether to approve or decline the transaction based on constraints indicated within the earlier request, and may transmit an authorization response message to the access device 112 via the transaction processing network 116. The transaction for which the code 108 has been presented may then be completed or declined based on the received authorization response message.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications policy. In at least some embodiments, each component of the depicted architecture may represent one or more special purpose devices configured to perform the described functions. In some embodiments, each component of the depicted architecture may comprise a cluster or group of devices that each perform the same, or a similar, function.

Figure 2:
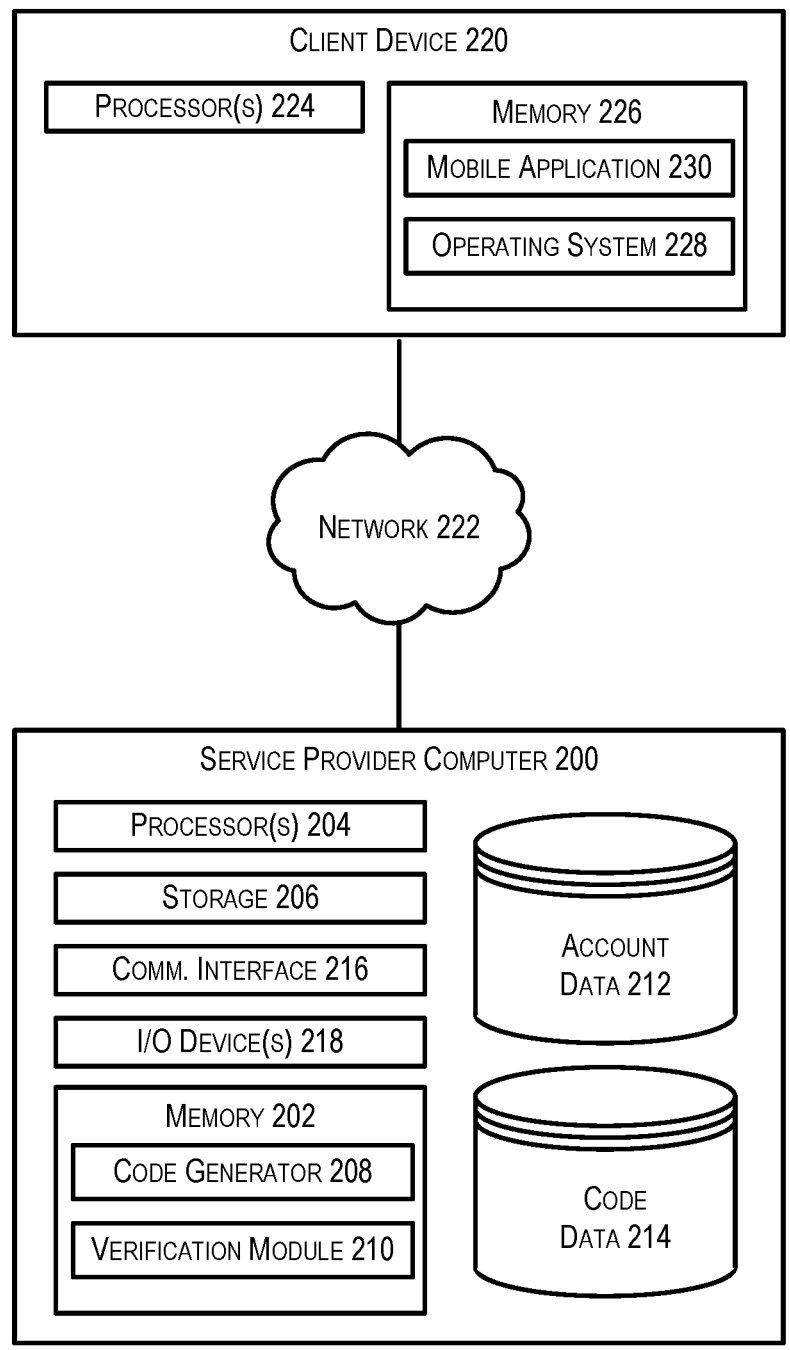
FIG. 2 depicts a diagram of an exemplary service provider computer 200 that may be configured to enable the generation and use of codes generated in accordance with at least some embodiments.

FIG. 2 depicts a diagram of an exemplary service provider computer 200 that may be configured to enable the generation and use of codes generated in accordance with at least some embodiments. The service provider computer 200 may be an example service provider computer 102 described with respect to FIG. 1. FIG. 2 also shows that the service provider computer 200 is in communication with a client device 220 via a network 222.

The service provider computer 200 may be any type of computing device capable of receiving a request from a client device, identifying a number of constraints associated with the request, associating a code with the request, and providing the code to the client device in response to the request. In at least some embodiments, the service provider computer 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service provider computer 200, the memory 202 may be volatile (such as random access memory (RAM)) and/or non-volatile (such as read-only memory (ROM), flash memory, etc.). The service provider computer 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the service provider computer 200. In some embodiments, the memory 202 may include multiple different types of memory, such as static random access memory (SRAM), dynamic random access memory (DRAM) or ROM.

Turning to the contents of the memory 202 in more detail, the memory 202 may include an operating system and one or more application programs or services for implementing the features disclosed herein including at least a module for generating or selecting a code to be associated with a transaction (code generator 208) and a module for determining whether a code received complies with constraints for a transaction (verification module 210). The memory 202 may also include account data 212, which maintains information associated with individual accounts, as well as code data 214, which maintains mappings between generated codes and various transactions/constraints.

In some embodiments, the code generator 208 may, in conjunction with the processor 204, be configured to receive a request for a code. The request may include a number of different transaction criteria. For example, the request may indicate a type of resource provider at which the code can be redeemed, a type of resource (e.g., good or service) for which the code can be redeemed, a maximum currency threshold for which the code can be redeemed, or any number of other suitable criteria. In some embodiments, the request may include an indication of a payment device to be used in completing the transaction. For example, the request may include a selection of a credit card associated with an account related to the transaction. In some embodiments, the account may be associated with only one payment device, which may be selected by default. In some embodiments, the request may include an identifier for a payment account which is not currently associated with the account.

In some embodiments, prior to generating a code in response to receiving the request, the code generator 208 may obtain pre-authorization for one or more interactions (e.g., a specific transaction) related to the request. For example, the service provider may generate an authorization request message comprising an account number associated with the selected payment device to be routed to an authorization entity (e.g., an issuer) associated with the selected payment device. In this example, because the potential resource provider may not be known, the service provider may act as the resource provider for the purposes of the authorization request message. Once the service provider computer 200 receives confirmation that the transaction is approved (e.g., via an authorization response message), the code generator 208 may associate a code with the received request. The authorization entity may place a hold of the account for an amount stated in the authorization request message. For example, a user's credit card may be selected and one hundred dollars may be held against a credit limit of one thousand dollars, such that the available to buy amount is now nine-hundred dollars. The user may be not be invoiced on the one hundred dollars, but will only be invoiced when actual transactions are conducted using the code. If the code is not used within a predetermined amount of time, the hold may be released.

In other embodiments, an actual authorization and settlement process may be performed at the time of code generation. In this case, the service provider computer 200 may maintain an escrow account with funds. When the code is used to conduct a transaction, funds can be withdrawn from the escrow account. If the code is not used within a predetermined amount of time, the funds can be returned to the user's account at the authorizing entity.

In some embodiments, the code may be selected by the service provider computer 200 from some list of maintained codes. For example, the service provider computer 200 may select a code which is currently not in use from a list of codes. In some embodiments, the service provider computer 200 may ensure that the latest use of the code was some threshold amount of time prior to a current date/time or pertains to a transaction limited to a geographic area some predetermined distance from a geographic location of the client device from which the request was received. In some embodiments, the code may be generated by the service provider computer 200. For example, the service provider may generate some random, or seemingly random, string of characters and/or numbers. In some embodiments, the code may include a static portion and an identifier. For example, the first portion of the code may comprise a routing identifier (e.g., a banking identification number (BIN)) that identifies the service provider computer 200 whereas the second portion of the code may comprise a string of characters unique to the request (e.g., a request identifier).

In some embodiments, the verification module 210 may, in conjunction with the processor 204, be configured to verify whether or not a transaction complies with the constraints associated with a code used in that transaction. In some embodiments, an authorization request message received by the service provider computer 200 in relation to the transaction may include a code and transaction details. Upon identifying the code, the verification module 210 may identify the constraints associated with that code. For example, the verification module 210 perform a query operation to identify one or more constraints associated with the code within a database table. The verification module 210 may then compare transaction details in the authorization request message with the identified one or more constraints to verify that the transaction complies with those constraints. For example, the verification module 210 may determine whether a resource provider type associated with the authorization request message (e.g., as indicated by a merchant code) matches those allowed via a constraint on resource provider type. If the verification module 210 determines that the authorization request message complies with each of the constraints stored in relation to the code, then the verification module 210 may generate an authorization response message that indicates the transaction should be approved. Otherwise, the verification module 210 may generate an authorization response message that indicates the transaction should be declined. In some embodiments, the verification module 210 may generate an authorization request to be sent to an authorization entity (e.g., the same authorization entity from which pre-authorization was obtained) in order to obtain payment for the amount of the transaction as indicated in the received authorization request message.

The service provider computer 200 may also contain communications interface(s) 216 that enable the service provider computer 200 to communicate with a stored database, another computing device or server, one or more client devices, and/or any other suitable electronic devices. In some embodiments, the communication interface 216 may enable the service provider computer 200 to communicate with other electronic devices on a network (e.g., on a private network). The service provider computer 200 may also include input/output (I/O) device(s) and/or ports 218, such as for enabling connection with a keyboard, a mouse, a pen, a voice input device, a touch input device, a display, speakers, a printer, etc.

The service provider computer 200 may be in communication with a number of client devices 220 via a network 222. A client device 220 may be capable of interacting with the service provider 200 to access an account. For example, the client device 220 may include a web browser or other application that enables a user of the client device 220 to access a website maintained by the service provider 200. Each client device may include at least a processor 224 and memory 226 that stores program instructions that are loadable and executable on the processor 224. The memory 226 may include at least an operating system 228, but may also include a mobile application 230.

In some embodiments, the client device 220 may include a mobile application 230 configured to, in conjunction with the processor(s) 224, provide an operator of the client device 220 with the ability to submit a request to the service provider 200 for a code, as well as to present a received code to the operator. In some embodiments, upon execution of the mobile application 230, the client device 220 may be caused to display a graphical user interface (GUI) that enables communication between the operator of the client device 220 and the service provider 200. In some embodiments, the operator may be required to log into an account maintained by the service provider 200 in order to authenticate the operator. In some embodiments, various other techniques for authenticating the operator may be used. Once the operator has been authenticated, the operator may be presented with a number of options for constraining a transaction for which a code may be requested. For example, the operator may interact with a number of radio buttons, drop-down menus, or text input fields to identify each of the constraints for a particular transaction. Each of the operator's selections may be conveyed to the code generator 208 of the service provider 200. This is described in greater detail elsewhere in this disclosure.

In some examples, the network(s) 222 may include any one or a combination of many different types of networks, such as cable networks, the Internet, wireless networks, cellular networks, and other private and/or public networks. While the illustrated example represents the client device 220 accessing the service provider 200 via the network(s) 222, the described techniques may equally apply in instances where the client device 220 interacts with a service provider 200 via a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

Figure 3:
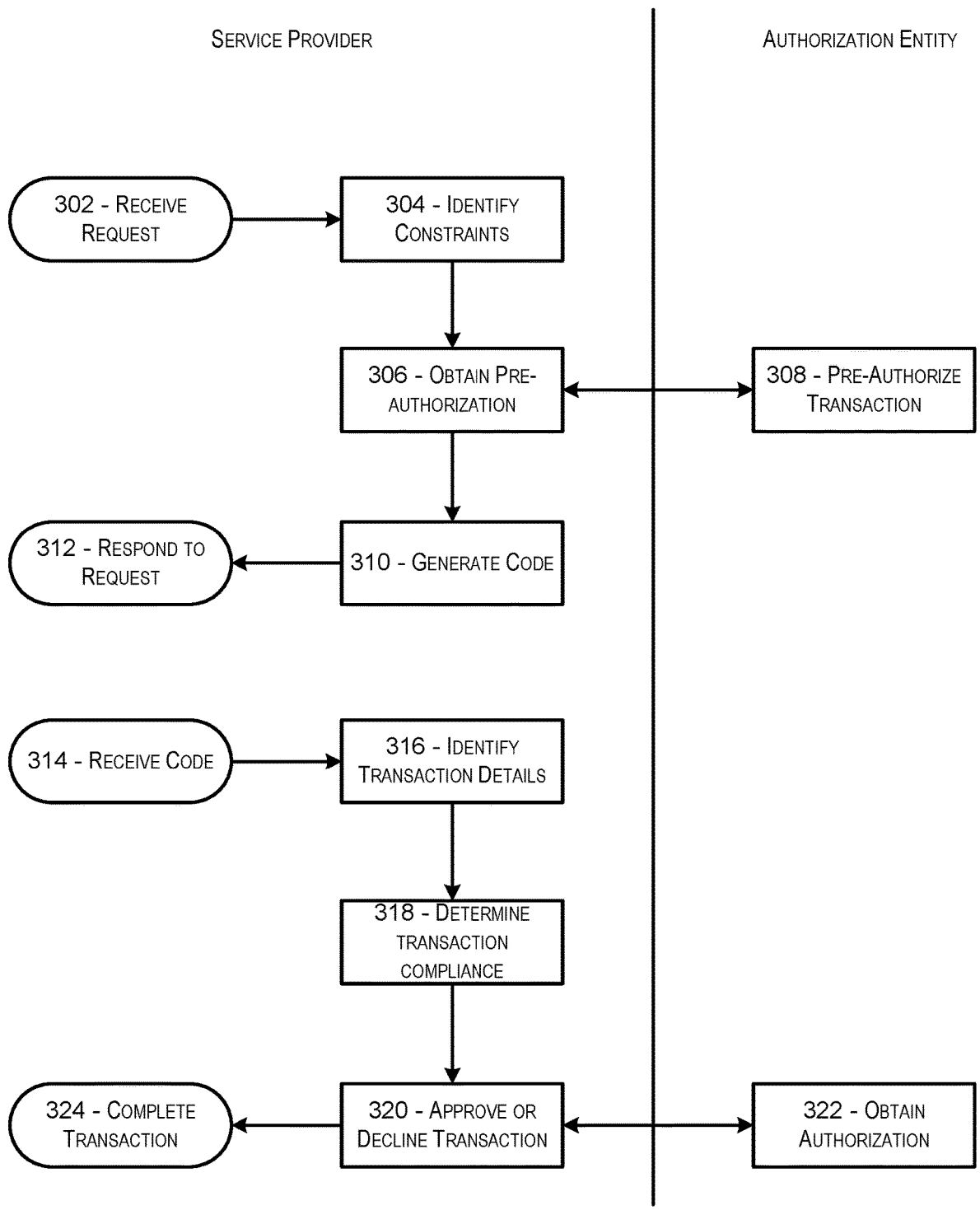
FIG. 3 depicts a flow chart illustrating a process for generating and redeeming a code in accordance with at least some embodiments.

FIG. 3 depicts a flow chart illustrating a process for generating and redeeming a code in accordance with at least some embodiments. Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the service provider computer 200 shown in FIG. 2. The code may be stored on a computer-readable storage medium, for example, in the form of a computer program including a plurality of instructions executable by one or more processors. The computer-readable storage medium may be non-transitory.

Process 300 may begin at 302, when a request is received with respect to a proposed transaction. At 302, a service provider computer may receive a request from a client device that a code be generated in association with one or more transaction constraints. In some embodiments, the request may be received via a mobile application installed upon a client device. The mobile application may cause the client device to authenticate the user prior to allowing the user to submit the request.

At 304, the service provider may identify a number of constraints for the potential transaction from the received request. For example, the received request may include an indication of a type of resource provider at which the proposed transaction may be completed, a type of resource that the proposed transaction may involve, a geographic location/region within which the proposed transaction must be completed, a maximum amount for which the transaction may be completed, a period of time within which the proposed transaction must be completed, or any other suitable constraint that may limit the proposed transaction.

At 306, the service provider computer may obtain pre-authorization for the proposed transaction. In some embodiments, the service provider computer may generate an authorization request message that includes an indication of one or more of the constraints in the received request. For example, the service provider computer may generate an authorization request message to obtain pre-approval for an amount indicated as being a maximum amount for the proposed transaction. In some embodiments, the service provider computer may generate the authorization request message to indicate that the service provider computer is the resource provider for the purposes of the proposed transaction.

Once the authorization entity has received the authorization request message, the authorization entity may determine whether to approve or decline the transaction based on the information provided in that authorization request message at 308. In some embodiments, this may involve determining whether the account associated with the selected payment device has sufficient funds to cover a maximum amount associated with the proposed transaction. In some embodiments, the authorization entity may determine whether the likelihood that the transaction is fraudulent is above or below some acceptable threshold level of risk. The authorization entity may respond to the authorization request message by providing an authorization response message that includes an indication as to whether or not the transaction is authorized.

Upon receiving pre-authorization for the transaction, the service provider computer may generate a code to be associated with the request at 310. In some embodiments, the service provider may generate the code. In at least some of these embodiments, the service provider may randomly generate or select a string of characters. By way of illustration, in a first example, the service provider may generate a random string of numeric characters. In s second example, the service provider may randomly select and combine words or phrases from a list of available words or phrases. In some embodiments, the service provider computer may maintain a list of codes from which the service provider computer may select. Once the code has been generated, the service provider computer may provide the code to the client device from which the request was received at 312.

At 314, the service provider computer may receive an authorization request message that includes the code generated at 310. The authorization request message may be received via a transaction processing network. Upon receiving the authorization request message, the service provider computer may identify a number of details related to the transaction for which the authorization request message was generated at 316.

At 318, the service provider computer may identify each of the constraints provided in relation to the code at 304. The service provider may then approve or decline the transaction based on the transaction's compliance with the constraints at 320. To do this, the service provider may compare the details of the transaction to each of those constraints in order to assess whether or not the transaction is in compliance with those constraints. For example, the transaction details may include a merchant category code (MCC) that indicates a category or type of merchant from which the authorization request message was received. The service provider may also determine that one of the constraints associated with the code is that the proposed transaction must be completed at a grocer. In this example, if the MCC indicates that the authorization request message has originated at a resource provider which is not a grocer, then the service provider may determine that the transaction is not in compliance with the constraints provided, and may subsequently decline the transaction. In some embodiments, the service provider computer may decline a transaction if the transaction is not in compliance with each and every constraint. In some embodiments, one or more constraints may be optional, in that the transaction may not be declined if the constraints are not complied with.

In some embodiments, the service provider computer, upon determining that the transaction is to be approved, may obtain authorization for the transaction at 322. To do this, the service provider computer may generate a second authorization request message that includes at least a portion of the details provided in the authorization request message that was received by the service provider computer at 314. For example, the service provider computer may identify an amount of the transaction from the received authorization request message, for which authorization may subsequently be sought by the service provider computer.

The service provider computer may respond to the authorization request message received at 314 with an authorization response message at 324. The authorization response message may include an indication as to whether or not the transaction indicated in the received authorization request message is approved or declined. In some embodiments, the service provider computer may also provide a notification to the client device from which the request was received at 302.

In other embodiments, the service provider computer, after checking to see that a transaction using a code satisfies the constraints associated with the code, can forward an authorization request message to an authorizing entity computer such as an issuer computer for the actual amount of the current interaction (e.g., transaction). For example, a pre-authorization hold of one hundred dollars may have previously been placed on a credit card account when the code was generated. The actual transaction conducted with the code may only be twenty dollars. The authorization request message transmitted to the authorizing entity computer may be for twenty dollars and may then seek approval for that twenty dollar transaction, while also reducing the hold on that code to eighty dollars. A conventional clearing and settlement process on the twenty dollars can then be performed.

It should be noted that in the process 300 described above, in some embodiments, the payment device associated with the generated code is not charged until the final transaction has been conducted. Hence, it should be noted that the generated code of the system described herein differs from a conventional prepaid device in that the user that provides the code is not charged until the code is used. Additionally, there is no "lost" value in that the user that provides the code need not pay some predetermined amount, of which some amount may remain unused. Hence, one skilled in the art would recognize that embodiments of the disclosure enable the use of a code which, if unused, would not result in financial loss to the user for whom the code was generated.

Figure 4A:
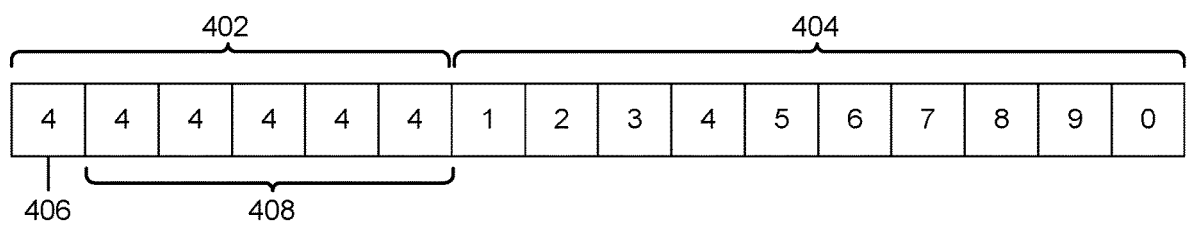
FIG. 4A depicts a first illustrative example of a code that may be generated using techniques described herein.
Figure 4B:
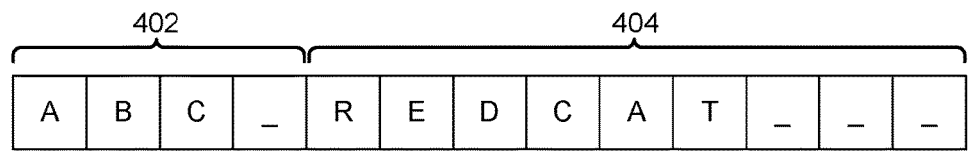
FIG. 4B depicts a second illustrative example of a code that may be generated using techniques described herein.

FIG. 4 depicts some illustrative examples of embodiments of a code that may be generated in accordance with at least some embodiments. In FIG. 4, two different embodiments of such a code are depicted as FIG. 4A and FIG. 4B. As depicted, each code may include a routing identifier 402 and a request identifier 404.

FIG. 4A depicts a first illustrative example of a code that may be generated using techniques described herein. In FIG. 4A, the code may be a 16-digit string of numeric characters that mimics a credit card number.

A routing identifier 402 may be any string of characters that identifies a transaction processing network and/or an authorization entity. In some embodiments, the routing identifier 402 may be a banking identification number (BIN). The routing identifier may include an indication of a transaction processing network 406 that comprises one or more digits. In some embodiments, the routing identifier may include a single digit that identifies the transaction network. The routing identifier may also include an indication of an authorization entity 408 configured to process the code in accordance with embodiments described herein, which may be the computing system. In some embodiments, the routing identifier may include a five digit number that identifies the computing system (i.e., authorization entity). Hence, an access device that receives the depicted code may first ensure that the string is of an appropriate length. It should be noted that credit card numbers are typically 16 digits long, so a code designed to be used on existing access devices capable of inputting credit card numbers may also be 16 digits in length. After checking the length of the code, the access device may identify the transaction processing network from the indication of the transaction processing network 406. In this system, the access device that receives the depicted code may transmit an authorization request to the indicated transaction processing network, which may subsequently forward that request to the service provider based on the indication of the authorization entity 408. The service provider may then identify the request associated with the code based on the request identifier 404. It should be noted that the service provider identified by the indication of the authorization entity 408 may be an entity which only handles codes generated and used in the fashion described. However, in some embodiments, the request identifier 404 may also include an indication that the code is one generated in the manner described.

FIG. 4B depicts a second illustrative example of a code that may be generated using techniques described herein. In FIG. 4B, the code may be any string of alphanumeric characters. In some embodiments, an access device for a resource provider may need to be configured to receive and/or utilize a code as depicted in FIG. 4B.

An access device that receives the code of FIG. 4B may be programmed to identify a transaction processing network from a first string of alphanumeric characters of the routing identifier 402. For example, if the routing identifier 402 includes the identifier "ABC", then the access device may be configured to route an authorization request message generated for a transaction that includes the code to the ABC transaction processing network for processing. The ABC transaction processing network may be configured to, based on the format of the received code, determine that the code is one used in accordance with the system described herein.

In some embodiments, the code may include a request identifier 404 that consists of some word or phrase that may indicate a specific request. It should be noted that the request identifier 404 may include a number of characters which is less than or equal to some maximum number of characters for the request identifier 404. In some embodiments, the request identifier 404 may consist of some nonsensical (or unintentionally sensical) word pairing or phrase. For example, the request identifier 404 may be generated by pairing a random adjective with a random noun. The use of this structure, along with the nonsensical nature of the word or phrase, may enable easier memorization of the code by a user of the system. In some embodiments, the request identifier 404 may be associated with a particular geographic region or location so that multiple of the same request identifier 404 can be used, each of which is associated with a different request based on geographic region. In some embodiments, the service provider, when generating a request identifier 404, may select a word or phrase which is not currently in use. In some embodiments, the word or phrase may be provided by a user of the system.

In some embodiments, an access device that receives the code shown in FIG. 4B may be able to convert the word phrase into numerical values using a lookup table or the like, before it is transmitted to a service provider computer.

In both FIG. 4A and FIG. 4B, the code may be formatted to include a first portion that identifies a transaction processing network and/or an authorization entity (routing identifier 402) and a second portion that identifies a request associated with the code (request identifier 404). It should be noted that the transaction processing network may also be an authorization entity.

Figure 5:
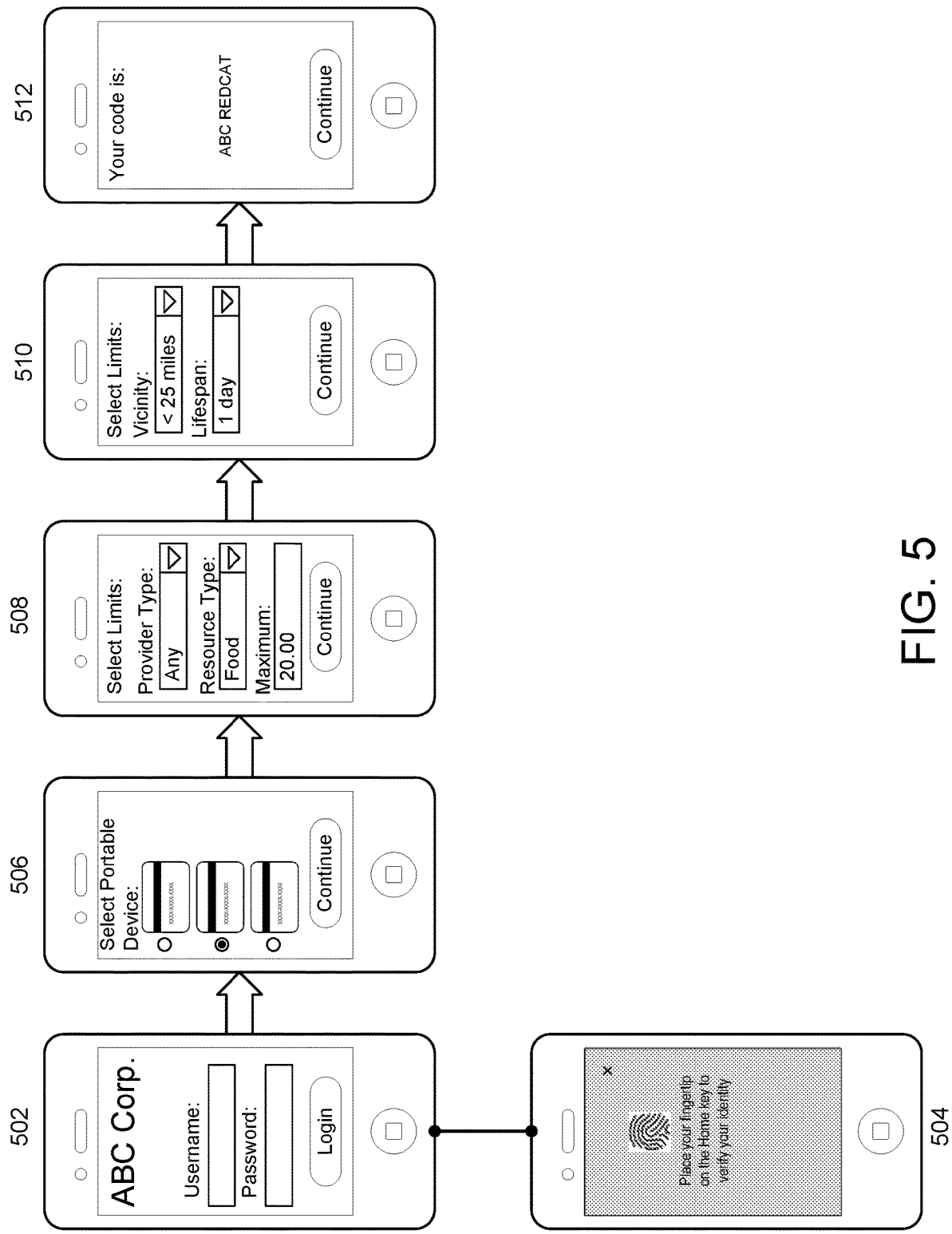
FIG. 5 depicts a number of example graphical user interface interactions that may be used to illustrate a code request submission process in accordance with at least some embodiments.

FIG. 5 depicts a number of example graphical user interface interactions that may be used to illustrate a code request submission process in accordance with at least some embodiments. The graphical user interface (GUI) may be a GUI displayed in accordance with instructions executed by a mobile application installed on a client device. For illustrative purposes, the GUI interactions are presented below as a series of screens.

Screen 502 depicts a login element for a mobile application installed on, and executed from, a client device. As depicted at 502, a user may be prompted to log in to an account maintained by a service provider computer. Based on the login information provided, the service provider computer may identify information associated with the user and/or the client device. For example, the service provider computer may identify one or more payment devices associated with the user based on the user information provided.

As depicted in screen 504, upon attempting login for the mobile application, the mobile application may cause the client device to initiate one or more authentication processes. An authentication process may involve any suitable collection and comparison of user information in order to authenticate a user's identity. In some embodiments, this may involve the use of biometric information (such as a fingerprint), providing login information associated with an account maintained by the service provider computer, answering personal questions, etc. It should be noted that authentication of the user in the manner depicted may assure the service provider computer that the user has assumed financial responsibility for the code to be generated.

Upon login, the user may be provided a list of payment devices available to that user as depicted at 506. In some embodiments, the list of payment devices may be an aggregated list of wallet services and other payment devices known to be associated with the user or client device. Some of the payment devices may represent electronic wallet applications or other token services and some of the payment devices may represent issuer-supported payment device options (e.g., credit cards). For example, the user may add a payment device to his or her account maintained by the service provider using an enrollment process. In this example, the service provider may retrieve each of the payment devices that the user has enrolled and list those payment devices in the screen 506. In some embodiments, the user may be associated with a single payment device or a default payment device. In these embodiments, the default or single payment device may automatically (e.g., without user interaction) be selected and the screen 506 may not be presented.

As depicted in screens 508 and 510, the mobile application may enable a user to provide an indication of one or more constraints (or limits) to be placed upon a proposed transaction. In some embodiments, the user may interact with a number of radio buttons, drop-down menus, text input fields, or other suitable indicators to identify each of the constraints for a particular proposed transaction. Each aspect of a proposed transaction may be either constrained or unconstrained based on user selection. An unconstrained aspect of a transaction may be an indication of a transaction detail for which any value is acceptable. A constrained aspect of a transaction may be an indication of a transaction detail for which only certain values are acceptable. In some embodiments, aspects of a transaction may be constrained by a range of values, a maximum value, a minimum value, an exact value, or any other suitable limitation on an aspect of a transaction. In some embodiments, the service provider computer may maintain a predefined set of constraints (e.g., a shortcut) that the user can quickly select. A predefined set of constraints may include a set of default constraints, or it may include a set of constraints which has previously been selected by the user.

Once a number of constraints have been selected by the user, the mobile application may convey those constraints, along with the user's selection of the payment device, to the service provider, which may then generate and provide a code. In some embodiments, the service provider may obtain authorization or pre-authorization from some authorization entity (e.g., an issuer). For example, upon receiving a selection of a payment device and a maximum amount of the transaction, the service provider may obtain pre-authorization for a transaction in the maximum amount from an issuer of the selected payment device. The service provider computer may then generate a code upon obtaining authorization/pre-authorization of the transaction. Upon receiving the code from the service provider, the code may be displayed by the mobile application as depicted in screen 512. Once provided, the code may be used to complete a transaction that complies with the indicated constraints. It should be noted that because the user has been authenticated to generate the code, a bearer of the code may not need to be authenticated upon presentation of the code to complete a transaction. Hence, the code may be used to complete a transaction by any entity having possession (physical or mental) of the code.

Figure 6:
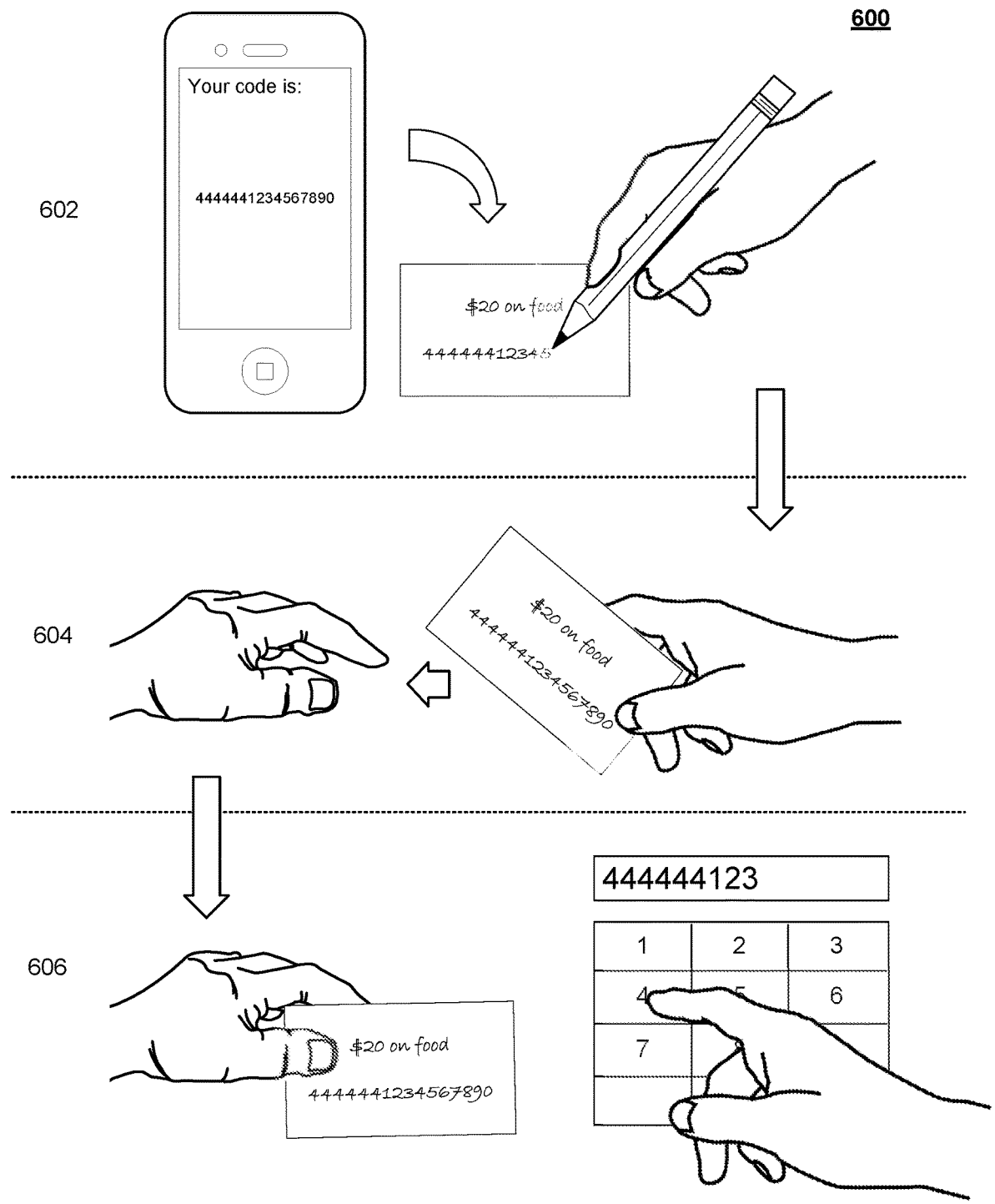
FIG. 6 depicts an example of an interaction that may occur using the system described in accordance with at least some embodiments.

FIG. 6 depicts an example of an interaction that may occur using the system described in accordance with at least some embodiments. In FIG. 6, a user may request a code in relation to a proposed transaction using techniques described herein. For example, the user may submit a request for a code using the techniques illustrated in, and described with respect to, FIG. 5.

At 602, upon submitting and receiving a code via processes described herein, a user may transfer the code to another medium in some embodiments. For example, the user may write down the code on a piece of paper or memorize the code. It should be noted that the particular medium onto which the code is transferred will have no bearing on the use of such code. In some embodiments, the code may be transferred to another client device electronically. For example, the code may be included in a text message or other messaging service transmission. In some embodiments, a code may be converted into a machine readable code (e.g., a barcode or quick response (QR) code). For example, a code transmitted to another electronic device may be converted into a QR code so that an access device may read the code from the screen of that electronic device. In some embodiments, the code may be printed by a printing device in communication with the client device. In at least some of these embodiments, the code may be printed as a machine-readable code.

At 604, the user that generated the code may transfer possession of the code and/or the medium that includes the code to a second user. There is no requirement that the second user have any relationship to the user that generated the code. It should be noted that transaction constraints associated with a particular code may not be readily apparent to one that receives that code. Hence, the user that generates and provides the code may need to make the second user aware of those constraints. For example, the user that generates the code may provide an indication that the maximum amount available by using the code is $20.00 and that the code can only be used to purchase food items.

At 606, the user may present the code as a payment device to complete a transaction at any resource provider capable of accepting that code. In some embodiments, the resource provider may manually enter the code into an access device (e.g., a POS terminal) in a manner similar to inputting a credit card number. In some cases, the access device may not be capable of differentiating the received code from an actual credit card number. In some embodiments, use of the code may not require any verification of the user's identity or other user authentication. This means that the code may be a bearer instrument in that any user is capable of redeeming the code by virtue of being in possession of (bearing) the code. In some embodiments, the user may be provided with the option to supplement a transaction by presenting a second payment device. For example, if the maximum amount for which the code can be redeemed is $20.00, and the transaction totals $25.00, then the user may make a payment of $20.00 with the code and may make a second payment of $5.00 using a different payment device. It should be noted that the resource provider, upon entering the code, is then provided with an indication as to whether the transaction is approved or declined based on whether the transaction is in compliance with constraints associated with that transaction. It should also be noted that, in contrast to various welfare and/or food stamp programs, there is no analysis of item types that takes place at the access device.

By way of illustration, consider some examples which illustrate various uses of the system described herein. In a first example, a user may encounter an unbanked individual (i.e., a person that does not have access to a bank account) such as a homeless individual. The user may wish to provide funds to the unbanked individual, but the user may be uncomfortable with providing such funds in that he or she cannot be sure that the funds will be spent appropriately. In this example, the user may generate a code that can be used at any merchant, but for food purchases only. In this scenario, the code can then be given to the unbanked individual and the user can be sure that the funds accessed using the code will be spent toward purchasing food. The user is able to provide this code even if he or she is not currently in possession of any cash.

In a second example, a first user may be approached by a second user. The second user may indicate to the first user that she is making a coffee run and may ask if the first user wants anything. The first user may generate a code that can be used to purchase a coffee from the local coffee vendor. The first user may then provide the code, along with his or her coffee order, to the second user. The second user may then use the code at the coffee vendor to pay for the first user's coffee order.

In a third example, a user that plans to travel in the future may generate a code that can be used anywhere in the location to which he or she is traveling. In this example, the user may memorize the code which is generated. In the event that the user is left without access to his or her funds (e.g., the user loses her wallet/purse), the user may use the memorized code to complete a transaction.

Figure 7:
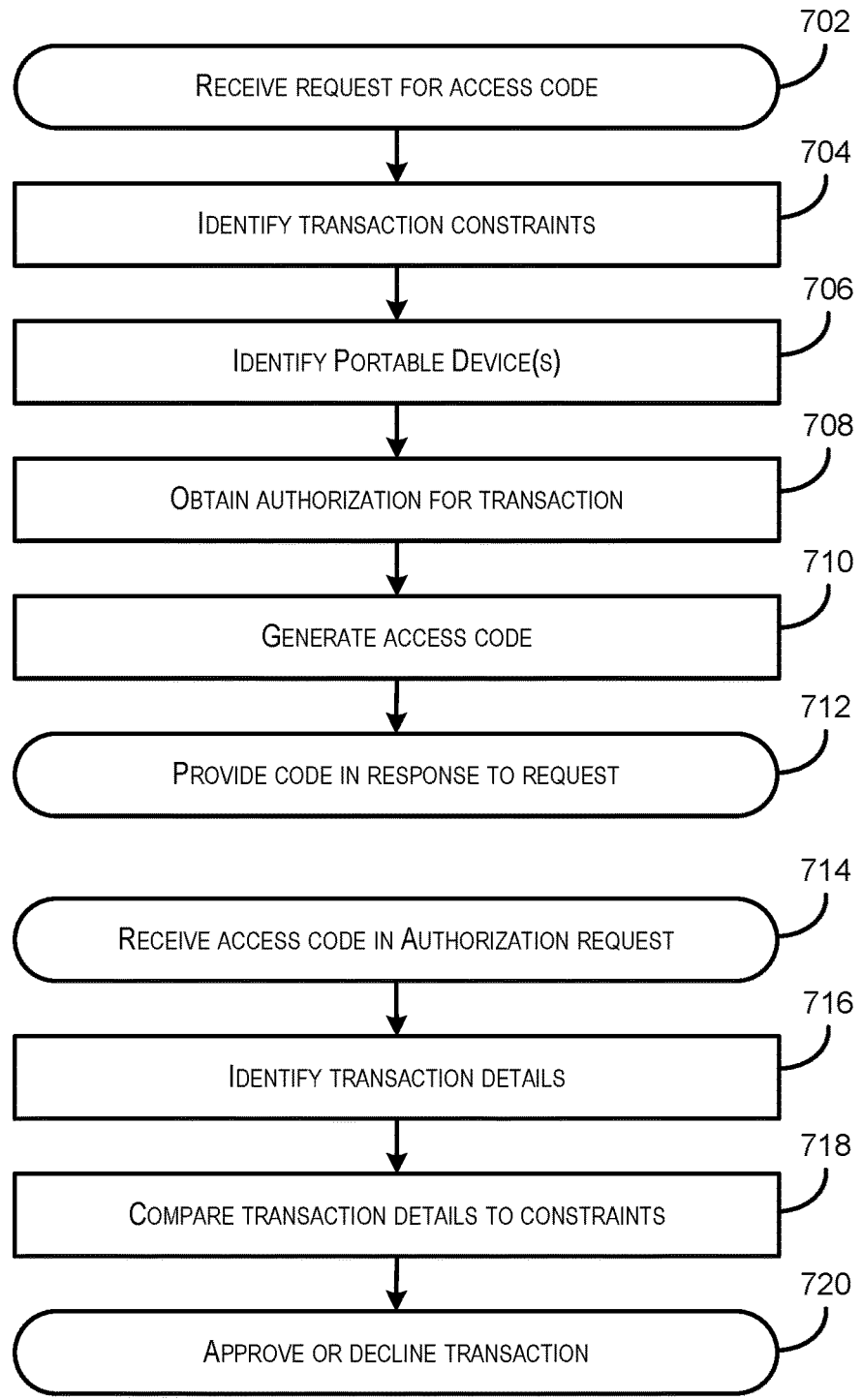
FIG. 7 depicts a flow diagram illustrating an example process for generation of, and subsequent redemption of, a code in accordance with at least some embodiments.

FIG. 7 depicts a flow diagram illustrating an example process for generation of, and subsequent redemption of, a code in accordance with at least some embodiments. In accordance with at least some embodiments, process 700 of FIG. 7 may be performed by a service provider computer (e.g., the service provider computer 200 of FIG. 2).

Process 700 may begin at 702, when a request for a payment code is received with respect to a proposed transaction. At 702, the process may involve receiving a request from a client device for a payment code to be generated along with an indication of one or more transaction constraints to be associated with that payment code. Various techniques for submitting such a request are described in greater detail above with respect to FIG. 5.

At 704, the process may involve identifying the one or more transaction constraints for the potential transaction from the received request. As described above, the received request may include an indication of a type of resource provider at which the proposed transaction may be completed, a type of resource that the proposed transaction may involve, a geographic location/region within which the proposed transaction must be completed, a maximum amount for which the transaction may be completed, a period of time within which the proposed transaction must be completed, or any other suitable constraint that may limit the proposed transaction.

At 706, the process may involve identifying a portable device such as a payment device to be associated with the proposed transaction. As described above, a user may be presented with a list of payment devices available to that user and may select a payment device from that list of payment devices. Alternatively, the user may be associated with a single payment device or a default payment device. In these embodiments, the default or single payment device may be selected automatically.

At 708, the process may involve obtaining authorization for the proposed transaction in relation to the identified payment device. In some embodiments, the process may involve generating an authorization request message that includes an indication of one or more of the constraints in the received request, and routing that authorization request message to an authorization entity associated with the identified payment device for authorization. For example, the process may involve generating an authorization request message for an amount indicated as being a maximum amount for the proposed transaction. In some embodiments, the process may involve determining whether the likelihood that the proposed transaction is fraudulent is above or below some acceptable threshold level of risk based on characteristics of the user.

At 710, the process may involve generating an access code such as a payment code. In at least some of these embodiments, the code may be randomly generated or the code may be selected. By way of illustration, in a first example, the process may involve generating a random string of numeric characters. In a second example, the process may involve randomly selecting and combining words or phrases (e.g., adjectives and nouns) from a list of available words or phrases. In some embodiments, a list of codes may be maintained from which a code that is not currently in use may be selected. In some embodiments, at least a portion of the payment code may be provided by the user. For example, the user may select a word or phrase that he or she would like included in the payment code. In these embodiments, the word or phrase provided by the user may comprise at least a portion of the payment code. Some examples of codes that may be generated at this step are described in greater detail with respect to FIG. 4. Once the code has been generated, the process may involve providing the code to the client device from which the request was received at 712.

At 714, the process may involve receiving an authorization request message that includes the code generated at 710. The authorization request message may be received via a transaction processing network. Upon receiving the authorization request message, the process may involve identifying a number of details related to the transaction for which the authorization request message was generated at 716. For example, the process may involve identifying a category or type of resource provider from which the authorization request message was received based upon a merchant category code (MCC) included in the authorization request message. It should be noted that an authorization request message typically includes a number of different transaction details arranged in a specific format. The format of an authorization request message is dictated by International Standards Organization (ISO) 8583, which also dictates the types of information included in such a message. It should be noted that a constraint may be created to correspond to any transaction detail included in an authorization request message.

At 718, the process may involve identifying each of the constraints provided in relation to the code at 704. The process may involve then approving or declining the transaction based on the transaction's compliance with the constraints at 720. To do this, the process may involve comparing the details of the transaction to each of those constraints in order to assess whether or not the transaction is in compliance with those constraints. For example, the transaction details may include a merchant category code (MCC) that indicates a category or type of merchant from which the authorization request message was received. The process may involve also determining that one of the constraints associated with the code is that the proposed transaction must be completed at a grocer. In this example, if the MCC indicates that the authorization request message has originated at a resource provider which is not a grocer, then the process may involve determining that the transaction is not in compliance with the constraints provided, and may subsequently decline the transaction. In some embodiments, the process may involve declining a transaction if the transaction is not in compliance with each and every constraint. In some embodiments, one or more constraints may be optional, in that the transaction may not be declined if the constraints are not complied with.

In some embodiments, upon determining that the transaction is to be approved, process may involve obtaining authorization for the transaction at 722. To do this, the process may involve generating a second authorization request message that includes at least a portion of the details provided in the authorization request message that was received at 714. For example, the process may involve identifying an amount of the transaction from the received authorization request message, for which authorization may subsequently be sought.

The process may further involve responding to the authorization request message received at 714 with an authorization response message at 724. The authorization response message may include an indication as to whether or not the transaction indicated in the received authorization request message is approved or declined. In some embodiments, the process may involve also providing a notification to the client device from which the request was received at 702 indicating a status of the transaction.

In some embodiments, the system described herein may be used to obtain access to remote resources over a network (e.g., resources on the Internet). For example, the access code may be used to gain access to specific data or services available via a remote device. In some embodiments, a user or administrator of a network resource may request the ability to provide access to that resource. In these embodiments, the user may request, and be provided with, an access code using the techniques described above.

By way of illustration, consider a scenario in which a website host manages access to remote resources over a network. In this example, the resources may be services (e.g., firewall services, anti-virus services, etc.) or data (content). The remote resources may be hosted on one or more webpages. In this scenario, the website host may request an access code that includes constraints on the access to the resource. For example, the request may specify an access code that grants a specific amount of time for, or a specific level of access to, the one or more webpages/resources. Once generated, the access code may be provided to a second user. The second user in this scenario may then access the resources using the access code provided that the request for access conforms to the constraints associated with the code. For example, upon entering the access code into a prompt, the second user may be directed to the remote resource or a webpage that includes the remote resource.

Embodiments of the disclosure provide for a number of advantages over conventional systems. For example, embodiments of the system described herein enable a user to untether and earmark funds from his or her payment device to be used later (either by that user or by another user). By doing this, the system enables use of a code by a person that need not be authenticated or verified. Hence, a user wishing to provide limited access some amount of his or her funds to an unverifiable individual is able to do so in an easy manner, while also enabling the ability to control what those funds are used for. Furthermore, embodiments provide advantages over prepaid device systems in that funds are not drawn upon until a transaction is actually completed, and only then for the amount of the transaction.

Furthermore, one skilled in the art would recognize that there are a number of technical challenges addressed by the embodiments described herein. In particular, the disclosure addresses challenges related to the ability to implement various concepts described herein. For example, the disclosure describes novel techniques that enable the creation of a payment code that can be used on existing hardware without any updates to that hardware. This enables the introduction of new functionality to legacy systems without imposing any burden on the owners of those legacy systems. To do this, some embodiments of the disclosure describe that the payment code may comprise data in a specific format. This formatted code may be used in the same manner as a credit card number or other payment device, which enables its use in existing point-of-sale systems capable of inputting such formats. The transaction information may then be routed to a service provider (in a manner similar to that of a credit card) based on the information in the formatted code. Once the service provider receives this transaction data, it is able to recognize that the transaction relates to a previously received request and process that transaction data differently than from that of a typical credit card number using the novel techniques described herein. Hence, the disclosure describes a system which is architected so that the novel functionality described herein can be provided while the downstream system participants are not impacted.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method comprising:
    receiving, at a computing system from a first user via a client device, a request for an access code and one or more transaction constraints on a use of the access code, wherein the access code is a payment code and the one or more transaction constraints includes at least a lifespan and an amount;
    identifying, by the computing system from the client device, a payment account to be associated with the access code;
    obtaining, by the computing system and using the payment account, pre-authorization for one or more potential interactions using the access code from an authorization entity associated with the payment account, wherein the authorization entity is caused to place a hold on the payment account for the lifespan and the amount;

upon obtaining pre-authorization for the one or more potential interactions, generating, by the computing system, the access code, the access code formatted as a credit card number and including at least an identifier that causes an access request that includes the access code be routed to the computing system, wherein a second user physically receives from the first user, a physical medium which is a piece of paper comprising the access code that includes payment information for making the access request;

receiving, at the computing system, from an access device, the access request comprising the access code including the payment information in an interaction involving the second user; and upon determining that the interaction complies with the one or more transaction constraints, providing, by the computing system, an indication to the access device that the interaction is authorized, wherein the hold on the payment account is removed by the authorization entity upon determining that no access request has been received in relation to an interaction that complies with the one or more constraints.

2. The computer-implemented method of claim 1, wherein obtaining the pre-authorization comprises transmitting, by the computing system, a pre-authorization request message to an authorization entity computer associated with the authorization entity, the pre-authorization request message including at least a portion of the one or more transaction constraints.

3. The computer-implemented method of claim 1, wherein at least a portion of the access code is provided by the first user.

4. The computer-implemented method of claim 1, wherein the access code comprises a request identifier.

5. The computer-implemented method of claim 4, wherein the request identifier identifies the request for the access code.

6. The computer-implemented method of claim 4, wherein the request identifier comprises a combination of two randomly selected words.

7. The computer-implemented method of claim 6, wherein the two randomly selected words comprise a randomly selected adjective and a randomly selected noun.

8. The computer-implemented method of claim 1, wherein the transaction constraints comprise at least one of a type of resource provider at which the one or more potential interactions may be completed, a type of resource that the one or more potential interactions may involve, a geographic region within which the one or more potential interactions are to be completed, or a period of time within which the one or more potential interactions are to be completed.

9. The computer-implemented method of claim 1, wherein the access code is written by the first user onto the piece of paper.

10. The computing system of claim 1, wherein the access code comprises a routing identifier that includes a number that identifies an authorizing entity computer associated with the authorizing entity.

11. The method according to claim 1, wherein the access request includes a request to access a resource, wherein the resource includes a good or service.

12. The method according to claim 1, wherein the payment code is randomly generated in response to the request for the access code.

13. The method according to claim 1, wherein the hold on funds in the payment account is further removed by the authorization entity upon determining that the access code is not used within a predetermined period of time.

14. A computing system comprising:
a processor; and
a memory including instructions that, when executed with the processor, cause the computing system to, at least:
receive, from a first user via a client device, a request for an access code and one or more constraints on a use of the access code, wherein the access code is a payment code and the one or more constraints includes at least a lifespan and an amount;
identifying a payment account to be associated with the access code;
obtain, using the payment account, pre-authorization for one or more potential interactions using the access code from an authorization entity associated with the payment account, wherein the authorization entity is caused to place a hold on the payment account for the lifespan and the amount;
upon obtaining pre-authorization for the one or more potential interactions, generating, by the computing system, the access code, the access code formatted as a credit card number and including at least an identifier that causes an access request that includes the access code be routed to the computing system, wherein a second user physically receives from the first user, a physical medium which is a piece of paper comprising the access code that includes payment information for making the access request;
receive from an access device, the access request comprising the access code including the payment information in an interaction involving the second user; and
upon determining that the interaction complies with the one or more transaction constraints, provide an indication to the access device that the interaction is authorized, wherein the hold on the payment account is removed by the authorization entity upon determining that no access request has been received in relation to an interaction that complies with the one or more constraints.

15. The computing system of claim 14, wherein the access code has sixteen digits.

16. The computing system of claim 14, wherein the access request is routed to the computing system by a transaction processing network.

17. The computing system of claim 14, wherein the access code comprises a routing identifier that includes a single digit that identifies a transaction processing network.

18. The computing system of claim 14, wherein the access code comprises a routing identifier that includes a five digit number that identifies the computing system.

19. The computing system of claim 14, wherein the access request is an authorization request message.

20. The computing system of claim 14, wherein the instructions further cause the computing system to provide a notification to the first user upon completion of the interaction.

* * * * *